United States Patent
Leisten et al.

(10) Patent No.: US 7,566,293 B2
(45) Date of Patent: Jul. 28, 2009

(54) DEVICE FOR RECIRCULATING OIL IN ROLLING BEARINGS

(75) Inventors: Winfried Leisten, Hilchenbach (DE); Wolfgang Denker, Freudenberg (DE)

(73) Assignee: SMS Demag AG, Düsseldorf (DE)

( * ) Notice: Subject to any disclaimer, the term of this patent is extended or adjusted under 35 U.S.C. 154(b) by 726 days.

(21) Appl. No.: 10/552,638

(22) PCT Filed: Mar. 18, 2004

(86) PCT No.: PCT/EP2004/002784

§ 371 (c)(1),
(2), (4) Date: Oct. 7, 2005

(87) PCT Pub. No.: WO2004/089559

PCT Pub. Date: Oct. 21, 2004

(65) Prior Publication Data

US 2006/0193544 A1 Aug. 31, 2006

(30) Foreign Application Priority Data

Apr. 10, 2003 (DE) .............................. 103 16 316

(51) Int. Cl.
*F16C 13/00* (2006.01)
*B21K 1/76* (2006.01)
(52) U.S. Cl. .................... 492/47; 29/898.1; 29/898.11; 277/353; 277/351; 277/408; 384/477; 384/488
(58) Field of Classification Search .................. 492/47, 492/45; 29/898.1, 898.11; 277/353, 351, 277/352, 408, 551, 552; 384/477, 481, 482, 384/488
See application file for complete search history.

(56) References Cited

U.S. PATENT DOCUMENTS 2,852,284 A * 9/1958 Bryson ........................ 277/351
4,283,063 A * 8/1981 Prescott ...................... 277/353
4,440,401 A * 4/1984 Olschewski et al. ......... 277/384

(Continued)

FOREIGN PATENT DOCUMENTS

FR  1 470 057  2/1966

(Continued)

OTHER PUBLICATIONS

Patent Abstracts of Japan, vol. 1999, No. 8, Jun. 30, 1999 & JP 11 062994 A (Nippon Seiko KK), Mar. 5, 1999.

*Primary Examiner*—Essama Omgba
(74) *Attorney, Agent, or Firm*—Friedrich Kueffner

(57) ABSTRACT

A device for recirculating oil from the end face of the barrel and the peripheral surface of the roll neck of rolling mill rolls. A sealing race arranged between the bearing elements and the end face of the barrel is mounted on the roll neck. A first conical ring body has a conical outer surface and a cylindrical inner surface that is seated on the outer surface of the sealing race and is sealed from the race, whereby inclination of the conical outer surface towards the end face runs towards the roll axis. A second conical ring body is rigidly mounted in the bearing housing and has a conical inner surface, which conical inner surface is arranged some distance opposite the conical surface of the first conical ring body, such that the two conical surfaces form a hydraulic pump gap that conveys oil away from the end face.

5 Claims, 2 Drawing Sheets

U.S. PATENT DOCUMENTS

| | | | | |
|---|---|---|---|---|
| 4,516,783 A | * | 5/1985 | Mitsue et al. | 384/482 |
| 4,623,153 A | * | 11/1986 | Nagasawa | 277/551 |
| 4,832,511 A | * | 5/1989 | Nisley et al. | 384/480 |
| 6,004,249 A | * | 12/1999 | Blais | 492/20 |
| 6,050,571 A | * | 4/2000 | Rieder et al. | 277/353 |
| 6,173,961 B1 | * | 1/2001 | Martin | 277/353 |
| 6,244,600 B1 | * | 6/2001 | Leturcq | 277/353 |
| 6,746,018 B2 | * | 6/2004 | Lewis et al. | 277/349 |
| 7,090,221 B2 | * | 8/2006 | Matsui et al. | 277/352 |

FOREIGN PATENT DOCUMENTS

| | | |
|---|---|---|
| GB | 1 308 098 | 2/1973 |

* cited by examiner

DEVICE FOR RECIRCULATING OIL IN ROLLING BEARINGS

BACKGROUND OF THE INVENTION

The invention concerns a device for recirculating oil from the area of the end face of the barrel and the peripheral surface of the roll neck of rolling mill rolls, which roll neck is supported in the bearing of a bearing chock, wherein a sealing race, which is arranged between the bearing elements and the end face of the barrel, is mounted on the roll neck.

It is well known that in rolling mill rolls, which are supported in and carried by bearing chocks, these bearings can be furnished with sealing races mounted on the roll necks against the roll necks of the roll and the roll barrel and can be sealed with additional flexible elastic gaskets, which partly form labyrinths and are connected with the roll neck and the bearing housing. The sealing devices generally satisfy the sealing requirements of a rolling operation.

In the rolling of rolled strip, for which quality requirements are especially stringent, e.g., in the case of rolling in dry temper rolling stands, the barrels of the rolls must be kept completely free of dirt and oil, since even a few individual drops of oil that get on the peripheral surface of the rolls in the rolling area from the bearing through the end face of the roll barrels have an adverse effect on the surface quality of the roll barrel and often make it necessary to change the rolls completely.

Attempts have already been made to admit compressed air into the sealing labyrinths to produce a flow of oil under the sealing races towards the bearing and thus to counteract this escape of drops of oil. This measure also proved unsuitable for reliably preventing the escape of individual drops of oil with the frequent result that the quality defects caused by the escape of oil were not detected until the inspection line following the rolling of the strip, usually not until after several coils of strip had been rolled, which by then all had the same defects.

The objective of the invention is to improve the previously known oil recirculation systems by eliminating the risk of the escape of even small amounts of oil with a high degree of reliability and with low maintenance expense.

This objective is achieved by a device of the general type described above for recirculating oil, which is characterized by a conical ring body with a conical outer surface and a cylindrical inner surface that is seated on the outer surface of the sealing race and is sealed from said race, such that the inclination of the conical outer surface towards the end face of the barrel runs towards the roll axis, and by an additional, second conical ring body that is rigidly mounted in the bearing housing and has a conical inner surface, which is arranged some distance opposite the conical surface of the first conical ring body, such that the two conical surfaces form a hydraulic pump gap that conveys oil away from the end face of the roll barrel.

In this regard, as the invention provides, the end of the pump gap that faces the roll barrel can open in an annular admission chamber, which is formed by lateral surfaces of the first conical ring body, which run in the radial direction relative to the axis and inclined thereto, by the radial lateral surface of a flange-like annular shoulder of the second conical ring body, which (radial lateral surface) lies some distance opposite the lateral surfaces of the first conical ring body, and by an outer surface section of the sealing race. In this regard, the outlet end of the pump gap that faces away from the roll barrel can open into an annular oil collection chamber, which is formed by a radially running lateral surface of the second conical ring body, by a lateral surface of a flange-like annular shoulder that is rigidly mounted in the bearing housing and lies some distance opposite the aforesaid lateral surface of the second conical ring body, and by a sidewall section of the first conical ring body, such that radial conveying channels, which are located in the bearing housing, and an outlet channel, which is located downstream of the radial conveying channels, are assigned to the oil collection chamber.

SUMMARY OF THE INVENTION

The first conical ring body can have a contact surface that is axially spaced from the outlet end of the pump gap PS and runs in the radial direction relative to the axis for seating on an annular seat, which likewise runs in the radial direction relative to the axis, in the stationary part of the bearing and can be made of a wear-resistant material.

This device is distinguished not only by greater reliability with a cost of construction that involves only a few parts; it can also be installed in existing sealing systems without much additional expense, since it occupies no more space than that occupied by double sealing systems, which are no longer needed. The device is also suitable for use in rolling mill bearings designed for other applications.

BRIEF DESCRIPTION OF THE DRAWINGS

The invention is explained below with reference to the specific embodiment illustrated in the drawings.

DETAILED DESCRIPTION OF THE INVENTION

Figure 1:
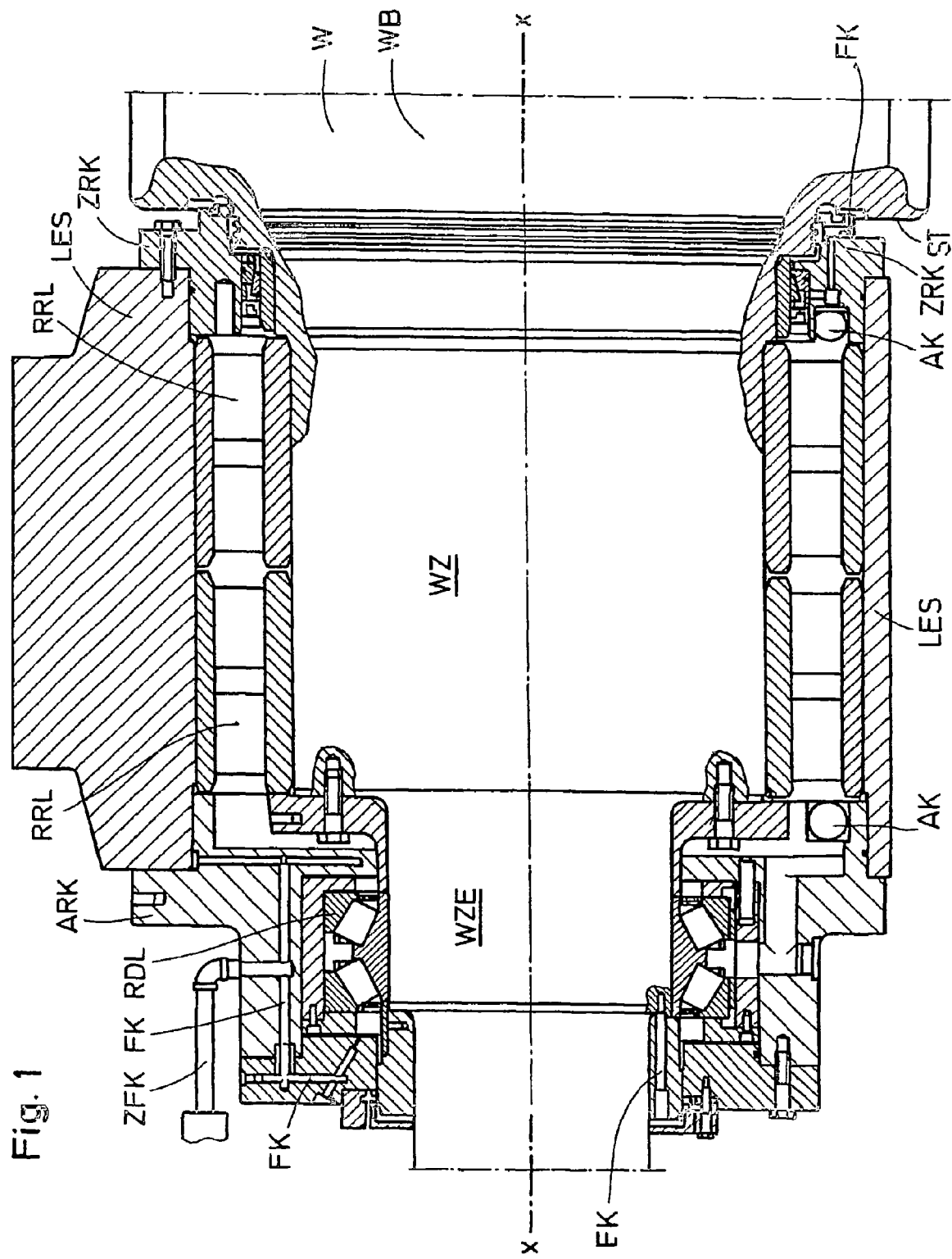
FIG. 1 shows the roll bearing in an axial section.

As FIG. 1 shows, the roll bearing consists of a pair of radial roller bearings seated on the neck WZ of the roll W and of a deep-groove-type radial ball bearing RDL seated on the end WZE of the neck that faces away from the roll barrel WB. The radial roller bearings are inserted in the bearing chock LES, and the deep-groove-type radial ball bearing RDL is seated in a terminal ring body ARK, which is mounted on the bearing chock LES on the side of the bearing chock LES that faces away from the roll barrel WB. On the other side of the bearing chock LES that faces the roll barrel WB, an intermediate ring body ZRK is mounted, which is furnished with sealing elements and sealing devices that will be explained in greater detail later.

Oil is supplied (by means that are not shown) to the bearings through admission channels ZFK and conveying channels FK connected with the admission channels ZFK and is removed again through outlet channels AK.

Figure 2:
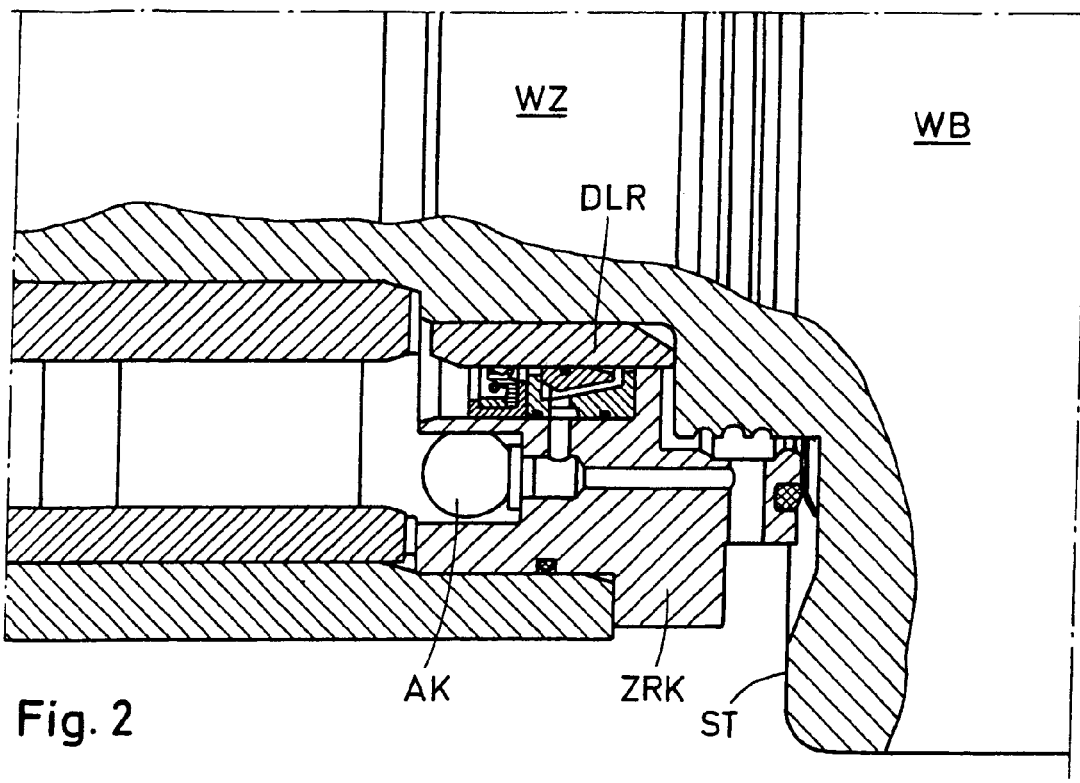
FIG. 2 shows an enlarged detail drawing from the drawing in FIG. 2.
Figure 3:
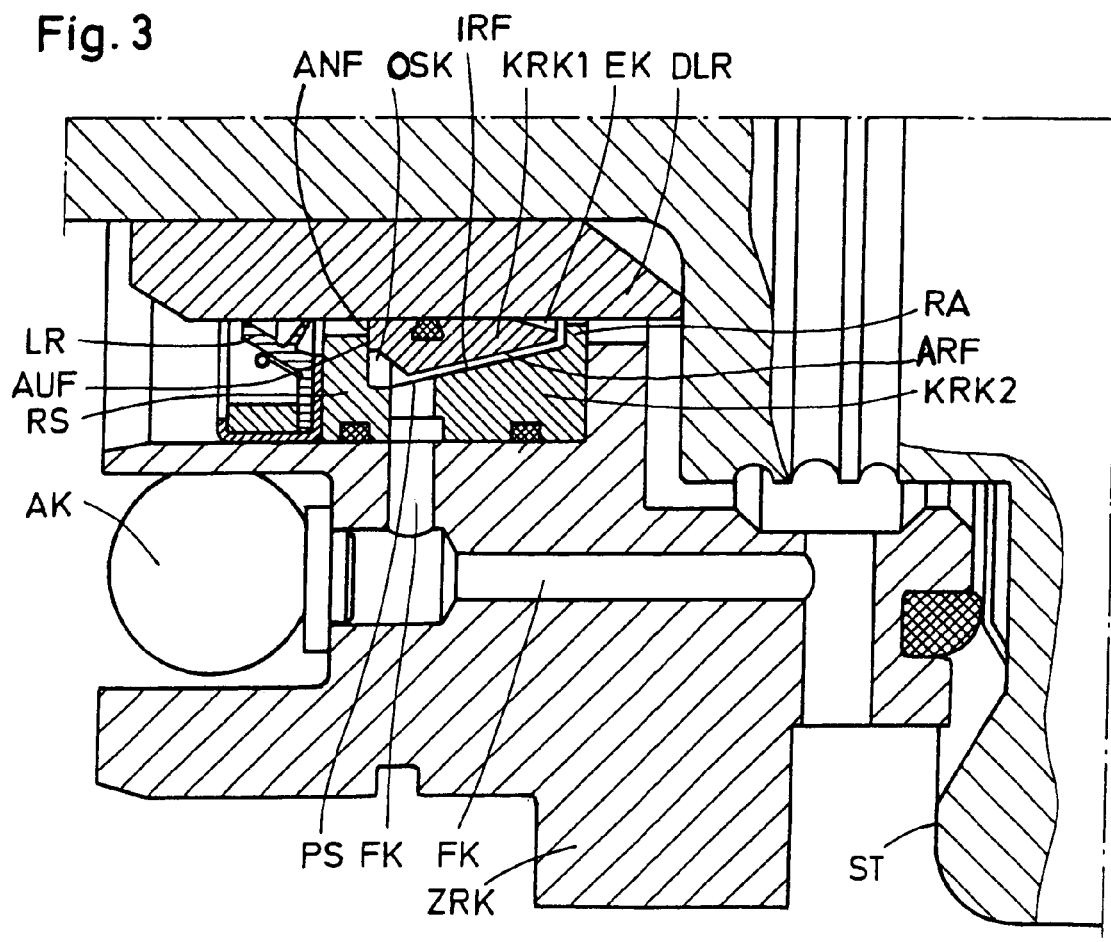
FIG. 3 shows the detail drawing in FIG. 2 further enlarged.

FIGS. 2 and 3 show that a sealing race DLR is mounted on the neck WZ between the roll barrel WB and the radial roller bearings RRL. The outer peripheral surface of the sealing race DLR is sealed by an elastic labyrinth ring LR, which is rigidly connected with the intermediate ring body ZRK. In addition, a first conical ring body KRK1 with a cylindrical inner surface is mounted on the cylindrical outer surface of this sealing race DLR, and the outer ring surface ARF of the first conical ring body KRK1 runs in the direction away from the roll barrel WB and is inclined towards the roll axis x-x (FIG. 1). A second conical ring body KRK2 is seated in the intermediate ring body. Its inner ring surface IRF, which also runs at an inclination and is spaced some distance from the outer ring surface ARF of the first conical ring body KRK1, forms, together with the outer ring surface ARF of the first conical ring body KRK1, a conical annular gap, i.e., the pump gap PS. The outlet end of the pump gap PS faces away from the roll barrel WB and opens into an oil collection chamber OSK, which is connected with an outlet channel AK by conveying channels FK, and the admission end of the pump gap PS faces towards the roll barrel WB and opens in an annular admission chamber EK. The admission chamber EK is formed by lateral surfaces of the first conical ring body KRK1, which run in the radial direction relative to the axis and inclined thereto, by the radial lateral surface of a flange-like annular shoulder RA of the second conical ring body, which (radial lateral surface) lies some distance opposite the lateral surfaces of the first conical ring body KRK1, and by an outer surface section of the sealing race DLR.

The first conical ring body KRK1 is made of a wear-resistant material and has an annular contact surface ANF, which is axially spaced from the outlet end of the pump gap PS and runs in the radial direction relative to the axis, for seating on a likewise annular seat AUF, which also runs in the radial direction relative to the axis and is mounted on a rigidly mounted ring segment RS of the bearing.

Since the first conical ring body KRK1 rotates about the stationary second conical ring body KRK2 during the rolling operation, the gap PS formed between them acts as a hydraulic centrifugal pump, which sucks out portions of oil that have entered the admission chamber EK from the bearing in the area of the end face ST of the roll barrel and the outer surface of the sealing race and returns them to the oil circulation via the oil collection chamber OSK, the conveying channels FK, and the outlet channel AK, thereby preventing the oil from getting onto the end face ST of the roll barrel WB and from there onto the peripheral surface of the roll barrel.

The device is also suitable for sucking out small amounts of fluids that get into the bearing via the roll barrel from the outside through defective seals, such as cooling water or residual lubricant emulsion, and removing them via the oil circulation of the bearing.

LIST OF REFERENCE CODE LETTERS

RRL radial roller bearings
RDL deep-groove-type radial ball bearing
LES bearing chock
W roll
WB roll barrel
WZ roll neck
ST end face (of the roll barrel WB)
WZE (stepped) end of the neck WZ
ARK terminal ring body
ZRK intermediate ring body
ZFK admission channel
FK conveying channel
AK outlet channel
DLR sealing race
LR labyrinth ring
KRK1 conical ring body (first)
KRK2 conical ring body (second)
x-x roll axis
IRF inner ring surface
ARF outer ring surface
PS pump gap
OSK oil collection chamber
EK admission chamber
ST end face (of the roll barrel WB)
RA (flange-like) annular shoulder
ANF contact surface
AUF seat
RS ring segment

The invention claimed is:

1. A device for recirculating oil from the area of the end face (ST) of the barrel (WB) and the peripheral surface of the roll neck (WZ) of rolling mill rolls (W), which roll neck (WZ) is supported in the bearing of a bearing chock (LES), wherein a sealing race (DLR), which is arranged between the bearing elements and the end face (ST) of the roll barrel (WB), is mounted on the roll neck (WZ), and wherein a first conical ring body (KRK1) with a conical outer surface and a cylindrical inner surface that is seated on the outer surface of the sealing race (DLR) and is sealed from said race, such that the inclination of the conical outer surface towards the end face (ST) of the barrel (WB) runs towards the roll axis (x-x), and a second conical ring body (KRK2) that is rigidly mounted in the bearing housing and has a conical inner surface are provided, which conical inner surface is arranged some distance opposite the conical surface of the first conical ring body (KRK1), such that the two conical surfaces form a hydraulic pump gap (PS) that conveys oil away from the end face (ST) of the roll barrel (WB), wherein an admission end of the pump gap (PS) that faces the roll barrel (WB) opens in an annular admission chamber (EK), which is formed by lateral surfaces of the first conical ring body (KRK1), which run in the radial direction relative to the axis and inclined thereto, by the radial lateral surface of a flange-like annular shoulder (RA) of the second conical ring body (KRK2), which radial lateral surface is arranged some distance opposite the lateral surfaces of the first conical ring body (KRK1), and by an outer surface section of the sealing race (DLR1).

2. The device in accordance with claim 1, wherein an outlet end of the pump gap (PS) that faces away from the roll barrel (WB) opens in an annular oil collection chamber (OSK), which is formed by a radially running lateral surface of the second conical ring body (KRK2), by a radial lateral surface of a flange-like annular shoulder (RS) that is rigidly mounted in the bearing housing and lies some distance opposite the aforesaid lateral surface of the second conical ring body (KRK2), and by a sidewall section of the first conical ring body (KRK1).

3. The device in accordance with claim 2, wherein radial conveying channels (FK), which are located in the bearing housing, and outlet channels (AK), which are located downstream of the radial conveying channels (FK), are in fluid communication with the oil collection chamber (OSK).

4. The device in accordance with claim 1, wherein the first conical ring body (KRK1) has an annular contact surface (ANF) that is axially spaced from an outlet end of the pump gap (PS) and runs in the radial direction relative to the axis for seating on a likewise annular seat (AUF) that runs in the radial direction relative to the axis in the stationary part of the bearing.

5. The device in accordance with claim 4, wherein the first conical ring body (KRK1) is made of a wear-resistant material.

* * * * *